United States Patent
Senge et al.

[15] 3,670,051
[45] June 13, 1972

[54] CARBONATE CONTAINING COPOLYMERISATION PRODUCTS AND PROCESS FOR THEIR PRODUCTION

[72] Inventors: Ferdinand Senge, Krefeld; Kurt Weirauch; Ludwig Bottenbruch, both of Krefeld-Bockum, all of Germany

[73] Assignee: Farbenfabriken Bayer Aktiengesellschaft, Leverkusen, Germany

[22] Filed: Jan. 28, 1970

[21] Appl. No.: 6,648

[30] Foreign Application Priority Data

Jan. 31, 1969 Germany.....................P 19 04 651.6

[52] U.S. Cl...........................260/873, 260/47 UP, 260/463
[51] Int. Cl......................................C07c 69/00, C08g 39/10
[58] Field of Search.................................260/873, 860, 463

[56] References Cited

UNITED STATES PATENTS 3,461,187  8/1969  Cantrill.................................260/873
3,506,739  4/1970  Cantrill.................................260/873

Primary Examiner—William H. Short
Assistant Examiner—Edward Woodberry
Attorney—Robert A. Gerlach and Sylvia Gosztonyi

[57] ABSTRACT

New polymeric products are provided which correspond to the statistical formula

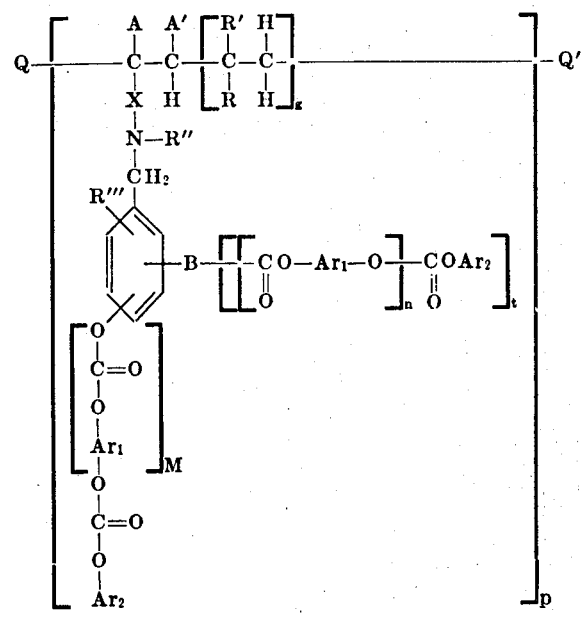

in which A is hydrogen or the methyl group,
A' is hydrogen or the radical

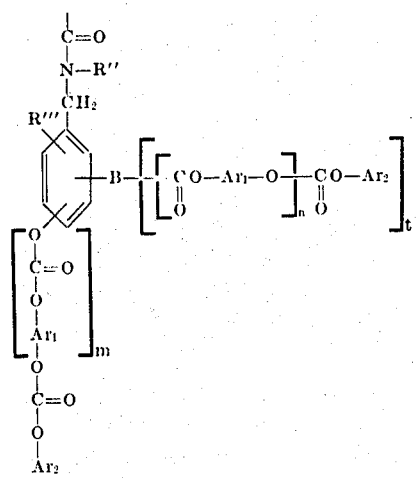

R is a hydrogen; halogen; a lower alkyl group having up to six carbon atoms; a phenyl group; a vinyl group;
an ester group

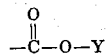

of a monohydric alcohol containing the hydrocarbon radical Y of those alcohols which contain up to about 18 carbon atoms including methanol, ethanol, propanol, isopropanol, butanol, isobutanol, hexanol, octanol, lauryl alcohol, stearyl alcohol and the like;
an ester group

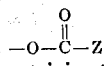

of a monocarboxylic acid containing the hydrocarbon radical Z of acids including acetic, propionic, butyric, benzoic and the like acids;
the amide group

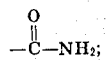

the nitrile group —C N
or an alkyl ether group, preferably those containing up to octoxy eight carbon atoms including methoxy, ethoxy, allyloxy, hexoxy, ocotxy and the like;
R' is hydrogen, halogen, methyl or nitrile,
R'' is hydrogen or a lower alkyl group having up to about six carbon atoms,
R''' is hydrogen, a lower alkyl group having up to about six carbon atoms, halogen, an hydroxy group or a phenolic radical which is bound directly or via a methylene group, an oxygen or sulphur atom, a sulphonyl or sulphoxide group, or a silane group,
X is the >C=O or the >SO$_2$ group;
B is oxygen or an optionally nucleus-substituted phenoxy radical which may be linked to the benzene ring either directly or via a carbon, oxygen, sulphur or silicon atom, with the proviso that when t is 0, B is hydrogen,
Ar$_1$ is a bivalent, optionally nucleus-substituted aromatic radical which may contain a free hydroxy group,
Ar$_2$ is a monovalent, optionally nucleus-substituted aromatic radical,
Q and Q' are the endgroups of the copolymerizates as they are formed by the copolymerization reaction initiated by ionic catalysts or free radicals,
g is an integer between about 9 and about 1,000,
m is an integer from about 5 to about 200,
n is an integer from 0 to about 200,
t is 0 or 1 and
p is an integer from 1 to about 15.

These new polymers are especially useful in the production of thermal and hydrolysis resistant thermoplastic resins.

10 Claims, No Drawings

CARBONATE CONTAINING COPOLYMERISATION PRODUCTS AND PROCESS FOR THEIR PRODUCTION

The most commonly known polycarbonate materials are generally linear polymers which are commercially advantageous because of their thermoplastic and extremely durable nature. Notwithstanding, however, linear thermoplastic polycarbonates possess some inherent disadvantages due to their melt flow properties and their lack of stability to thermal and hydrolytic degradation, particularly when employed in the presence of steam, hot water, hydrolyzing liquids and the like. Such deficiencies have prevented the use of polycarbonate materials for the preparation of articles used daily such as crockery, containers and the like and also for the preparation of surgical materials and so on.

It is therefore an object of this invention to provide a new polymeric material which is devoid of the foregoing disadvantages.

Another object of this invention is to provide a new polymeric polycarbonate material having improved melt flow properties and increased stability to thermal and hydrolytic degradation.

Still another object of this invention is to provide a synthetic material which can be thermoplastically processed and which is suitable for the production of articles which must have high resistance to hot water, steam and hydrolytic fluids.

Still another object of this invention is to provide a new polymeric material suitable for use in the production of crockery, surgical instruments, containers, as raw materials for varnishes and so on.

The foregoing objects and others are accomplished in accordance with this invention, generally speaking, by providing as a new composition of matter a polymeric compound having the statistical formula:

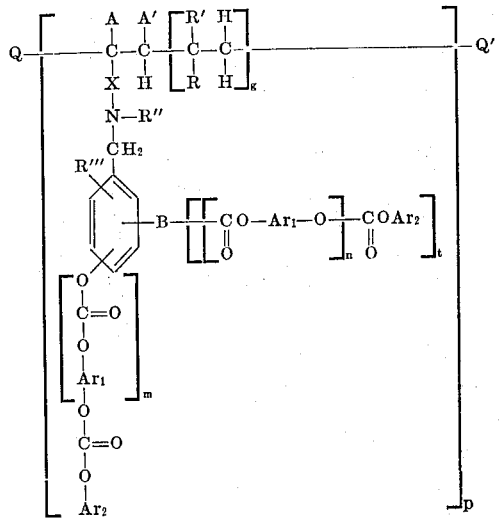

A' is hydrogen or the radical in which A is hydrogen or the methyl group,

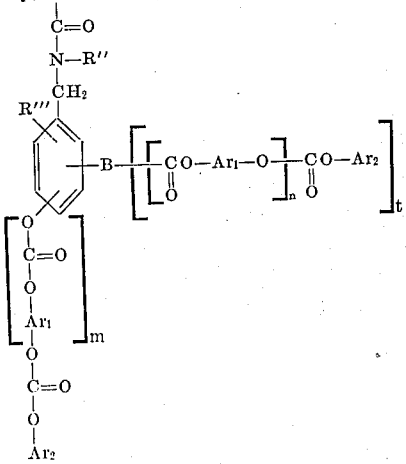

R is hydrogen; halogen; a lower alkyl group having up to six carbon atoms; a phenyl group; a vinyl group;

an ester group

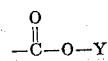

of a monohydric alcohol containing the hydrocarbon radical Y of those alcohols which contain up to about 18 carbon atoms including methanol, ethanol, propanol, isopropanol, butanol, isobutanol, hexanol, octanol, lauryl alcohol, stearyl alcohol and the like;

an ester group

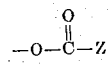

of a monocarboxylic acid containing the hydrocarbon radical Z of acids including acetic, propionic, butyric, benzoic and the like acids;

the amide group

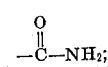

the nitrile group $-C\equiv N$
or an alkyl ether group, preferably those containing up to about eight carbon atoms including methoxy, ethoxy, allyloxy, hexoxy, octoxy and the like;

R' is hydrogen, halogen including fluorine, chlorine, bromine and iodine, methyl or nitrile;

R'' is hydrogen or a lower alkyl group having up to about six carbon atoms including methyl, ethyl, propyl, butyl, pentyl, hexyl, isomers thereof and the like;

R''' is hydrogen, a lower alkyl group having up to about six carbon atoms as described for R'', halogen as described for R', an hydroxy group or a phenolic radical which is bound either directly or via a methylene group, an oxygen or sulphur atom, a sulphonyl or sulphoxide group, or a silane group;

X is the $>C=O$ or the $>SO_2$ group;

B is oxygen or a phenoxy radical which may or may not be substituted on the nucleus and which may be linked to the benzene ring either directly or via a carbon, oxygen, sulphur or silicon atom, with the proviso that when $t$ is 0, B is hydrogen;

$Ar_1$ is a bivalent aromatic radical which may or may not contain substituents on the nucleus and which may contain a free hydroxy group such as, for example, phenylene, a-naphthalene, b-naphthalene, a-anthracene, g-anthracene, fluorene, phenanthrene, biphenylene, triphenylene and the like;

$Ar_2$ is a monovalent aromatic radical which may or may not be substituted on the nucleus such as, for example, a methyl, ethyl, propyl, butyl or halogen substituted phenyl, naphthyl, anthryl, phenanthryl and the like radical;

Q and Q' are the endgroups of the copolymerisates as they are formed by the copolymerization reaction initiated by ionic catalysts or free radicals, $g$ is an integer from about 9 to about 1,000,
$m$ is an integer from about 5 to about 200,
$n$ is an integer from 0 to about 200,
$t$ is 0 or 1 and
$p$ is an integer from 1 to about 15.

In the foregoing statistical formula the segment which repeats $g$ number of times is prepared by copolymerizing unsaturated monomers containing substituents as defined for R' and R. Thus, this segment of the polymer may be derived from a mixture of ethylenically unsaturated monomers in which case R may differ for each segment derived from each different monomer and R' may or may not also vary or else it may be prepared from a single monomer which repeats a sufficient number of times to satisfy the number represented by g in which case R and R' may be the same in each repeating segment. In the former case, statistical formula I may be written as follows:

I'

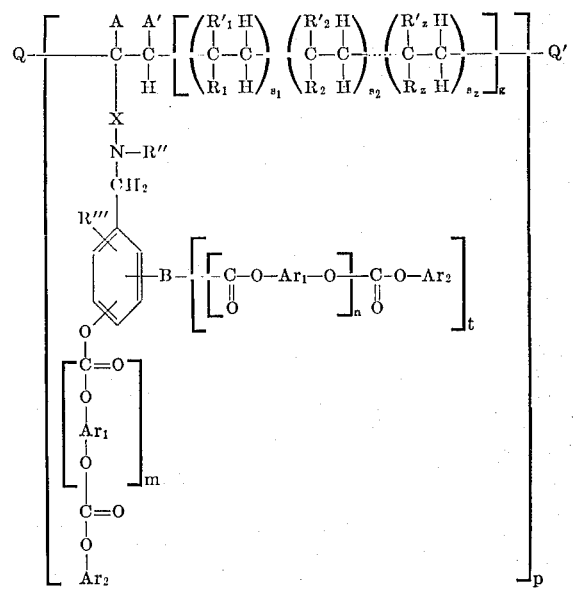

wherein all the units are as hereinbefore defined and $R_1, R_2 ... R_z$ are the same or different substituents as defined for R; $R'_1, R'_2 ... R'_z$ are the same or different substituents as defined for R'; $s_1, s_2 ... s_z$ are the same or different integers between 0 and about 1,000, g is a number from 1 to about 1,000 while the product $(s_1 + s_2 + ... s_z) \cdot g$ being a number from about 9 to about 1,000.

By this formula there is indicated that when the segment $[\ ]_g$ is a copolymer, the unique segments $(\ )_{s1}, (\ )_{s2} ... (\ )_{sz}$ thereof themselves may be monomeric units $(s_1, s_2 ... s_z = 1)$ or blocks $(s_1, s_2 ... s_z > 1)$. As the whole segment $[\ ]_g$ is limited to $g =$ about 9 to about 1,000, in the latter case the product $(s_1 + s_2 ... + s_z) \cdot g$ must be also limited to about 9 to about 1,000.

The new polymeric compounds of this invention are superior to the known linear polycarbonates due to their improved melt flow properties and their increased stability to thermal and hydrolytic degradation. Since the new polymers of this invention can be thermoplastically processed, they are particularly suitable for producing articles which must have an especially high resistance to hot water and steam as well as to fluids which cause hydrolysis upon the application of heat. Some such articles include, for example, articles used daily such as domestic utensils as well as surgical instruments, containers and the like. The new polymeric compounds can also be used as raw materials for lacquers and varnishes.

The new compounds of this invention can be prepared by reacting a polycarbonate forming derivative of carbonic acid with bivalent phenols which may or may not contain substituents on the nucleus, and a monovalent phenol and a copolymer having the formula:

II

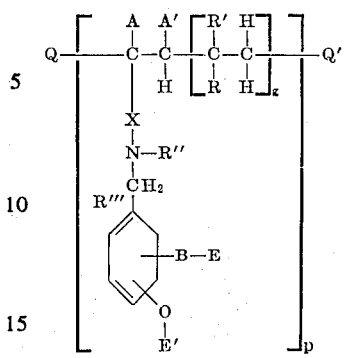

or, as explained for Formula I,

II'

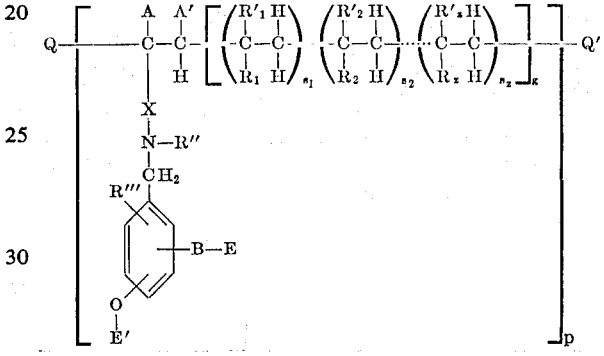

in which A, A', $R'_1, R'_2...R'_z$, R'', R''', $R_1, R_2...R_z$, X, B, Q, Q' and $s_1, s_2...s_z$, g and p are as already defined and E and E' are hydrogen, the chlorocarbonic acid ester group, the monophenyl carbonic acid ester group or the trimethylsilyl group, and may be the same or different.

In other words this method is similar to the known methods for preparing polycarbonates, wherein, however, part of the monophenol is substituted by copolymers according to formula II or II' respectively.

The copolymers of formula II (and II') may be obtained by copolymerizing ethylenically unsaturated monomers with a reaction product of an N-methylol or N-methylol ether compound of ethylenically unsaturated acid amides of the formula IIIa

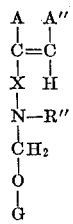

wherein A'' is

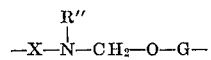

and

G is hydrogen or lower alkyl, with a mono or bivalent aromatic hydroxy compound which may or may not contain substituents on the nucleus in the presence of a catalytic amount of a strong acid, or with their chlorocarbonic acid esters, monophenyl carbonic acid esters or trimethyl silane derivatives. Thus, compounds having the formula

III

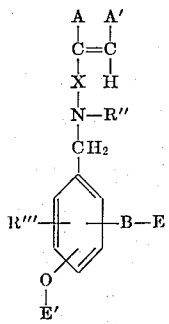

are copolymerized with copolymerizable monomers having the formula

IV

(wherein R' and R are as already defined) in a molar ratio such that one part of the compound of formula III is used to the sum of the parts of the copolymerizable monomer or mixtures thereof. Known methods may be used for effecting the copolymerization such as, for example, ionic copolymerization, preferably, however, by free radical copolymerization, preferably with the use of masked phenols and especially the trimethyl silane derivatives. The last mentioned compounds are easily obtained by reacting the corresponding phenols with, for example, hexamethyl disilazane or with trimethyl chlorosilane in the presence of an acid acceptor. Compounds of formula III, methods for their production and methods for the production of copolymers therefrom are described in many details, for example, in the British Pat. No. 1,134,341.

The copolymers of the formula II (and II') can also be produced by reacting in the presence of a catalytic amount of a strong acid, a copolymer having the formula

V

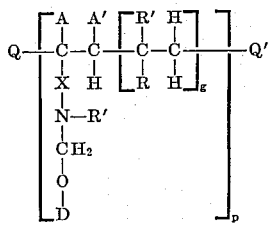

or, as explained for in Formula I,

V'

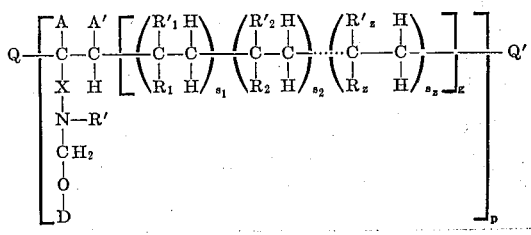

in which all of the substituents are as hereinbefore defined and D is an alkyl radical having up to six carbon atoms as defined for R'' or hydrogen, with mono or bivalent phenols which contain no substituents in the o- or p- position and which have the formula

VI

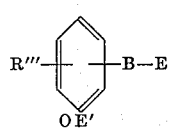

as described and claimed in our copending application, Ser. No. 004,404, filed Jan. 20, 1970, relating to "NEW LINEAR COPOLYMERIZATION PRODUCTS AND PROCESS FOR THEIR PRODUCTION", now abandoned. Thus, the copolymers of formula V (and V') are reacted with phenol, o- or p-cresol, resorcinol, hydroquinone, 4,4'-dihydroxydiphenyl, bisphenols which are halogenated on the nucleus, bis(hydroxyphenyl)-alkanes, cycloalkanes, ethers, sulphides, ketones, sulphones, sulphoxides, dimethylsilanes and the like including those listed in U.S. Pat. Nos. 3,271,367; 3,271,368; 3,280,073; 3,014,891; 3,148,172; 2,999,835; 3,028,365; 2,999,846 and the like. The reaction takes place in the presence of acids, e.g., concentrated hydrochloric acid, sulfuric acid, sulfonic acid, phosphoric acid and the like, and, expediently, in the presence of solvents, such as methylene chloride, ethylene chloride, chlorobenzene, toluene, xylene and the like to yield the copolymers II (II'). Reaction temperatures suitable for this reaction are between about 20° and about 120° C.

The following copolymerizable monomers are exemplary of the compounds of formula IV which may be used for the production of the copolymers of formula II (and II') or V (and V'): ethylene, propylene, butylene, isobutylene, vinyl chloride, vinylidene chloride, acrylic and methacrylic acid, their alkyl esters, amides and nitriles, particularly the esters of aliphatic alcohols such as methyl, ethyl, propyl, butyl, isobutyl, amyl, hexyl, 2-ethylhexyl, octyl, lauryl and stearyl alcohol and the like; styrene and a-methyl-styrene as well as their nuclear substituted derivatives; vinyl acetate, vinyl propionate and vinyl benzoate; diolefins such as butadiene and isoproprene; vinyl methyl-, ethyl- and isobutyl ether, vinyl toluene, p-ethyl-styrene, 2,4-dimethyl styrene, o-chlorostyrene; maleic acid as well as its anhydride, imide and esters thereof as well as any of those ethylenically unsaturated monomers listed in U.S. Pat. No. 3,225,119. Such compounds may be used either alone or in admixture with one another.

As mono- and bivalent aromatic hydroxy compounds which may be nucleus-substituted and in which possibly two hydroxyaryl radicals may be linked with one another directly or via a C, O, S or Si-bond, and which may be used for the condensation with monomeric acryl-, methacryl- or vinyl-sulphonic acid amidemethylol or -methylol ether compounds, or with fumaric acid diamide bis-methylol or bis-methylol ether compounds, in order to prepare monomer III or with the corresponding copolymers which are obtained with the aid of the above monomers in order to prepare copolymer II (and II') there may be mentioned, for example: phenol as well as its nucleus-substituted derivatives in which at least one o- or p-position must be unsubstituted, hydroquinone or 2,2-[4,4'-dihydroxydiphenyl]-propane which is briefly designated in the following as bisphenol A as well as any such compounds listed in the patents cited herein and the like and mixtures thereof.

In order to be incorporated as bivalent aromatic radicals $Ar_1$ into the endproducts I (and I') any bivalent phenol may be reacted with the copolymers of formula II (and II') which is known for the production of polycarbonate chains including hydroquinone, resorcinol, 4,4'-dihydroxydiphenyl, bis-(4-hydroxy-phenyl)-alkanes, such as bis-(4-hydroxyphenyl)-methane, bis-(4-hydroxyphenyl)-1,1-ethane, bis(4-hydroxyphenyl)-1,1-propane, bis-(4-hydroxyphenyl)-2,2-propane, bis-(4-hydroxyphenyl)-1,1-butane, bis-(4-hydroxyphenyl)-2,2-butane and the like; 1,1-bis-(hydroxyphenyl)-cycloalkanes, ethers, sulphides, ketones and sulphones as well as bisphenols which are nucleus-halogenated, a,a-bis-(p-hydroxyphenyl)-p-diisopropyl-benzene and the like including those listed in the patents cited herein.

Suitable monovalent aromatic compounds which may either be substituted or unsubstituted on their nucleus and from which the $Ar_2$ terminal groups of the formula are derived include, for example, phenol, cresols, mono- and dichlorophenols, p-tert.-butylphenol and any of those listed in the patents and texts cited hereinbefore.

If copolymers containing free hydroxyphenyl side chains or phenylcarbonic acid ester or trimethylphenoxysilane side chains are to be prepared, the reaction can be carried out using diesters of carbonic acid, preferably diaryl carbonates such as diphenyl carbonate, the cresyl carbonates, dichlorophenyl carbonates, bisphenyl carbonates of bivalent phenols and the like in a transesterification reaction at temperatures of between about 150° and about 350° C. in which alkaline or acidic transesterification catalysts may be employed in the usual amounts. Such reactions are described in detail in *Chemistry and Physics of Polycarbonates* by Hermann Schnell and *Polycarbonates* by Christopher and Fox, for example. If silane copolymers are used, the reaction is virtually the same as that of the copolymers which contain free hydroxyphenyl radicals as terminal groups in their side chains since the trimethyl-silane radicals readily split off because of intersilylation.

The polycarbonate side chains can also be prepared in a known manner by using phosgene or bischlorocarbonic acid esters of bivalent phenols in a homogeneous solution or in a two-phase solvent mixture, according to the interfacial polycondensation method, using acid acceptors such as tertiary amines or alkali metal or alkaline earth metal hydroxides, preferably with the addition of catalysts and particularly tertiary amines. Such processes are described in detail in the patents and texts cited hereinbefore. The reaction temperatures for this process are usually between about 0° and about 50° C. The solvents used should be among those in which copolymer II and, preferably, the final product are soluble. Such suitable solvents include, for example, methylene chloride, chloroform, chlorobenzene and mixtures thereof and the like including those listed in the patents and texts cited herein. In such solution processes, those copolymers in which the terminal groups of the side chains consist of phenylchloro-carbonic acid ester groups may also be used as well as phenol and trimethyl-phenoxy-silane copolymers.

The amount of the bivalent phenols and carbonic acid derivatives to be used per mol of the copolymer of formula II may vary within wide limits depending upon whether shorter or longer polycarbonate side chains are desired. However, at least 1 mol of bivalent phenol and carbonic acid derivative should be used for every phenolic hydroxyl group of copolymer II so that at least one carbonate or polycarbonate chain is grafted onto every phenol group of the copolymer. The preferred amounts can easily be calculated from the numerical values of $m$ and $n$ in formula I.

The new polymeric compositions of this invention may contain substituents in addition to those specially spelled out in the statistical formula. Thus, for example, any of the aromatic nuclei contained in the polymer may contain substituents as can any of the aliphatic groups. Any suitable substituent may thus be contained in the polymer but preferably those substituents which are inert to the reaction components during the production of the polymers. Some suitable substituents which may be employed include, for example, halogen atoms including fluorine, chlorine, bromine, iodine; lower alkyl radicals such as, for example, methyl, ethyl, butyl, hexyl and the like; alkoxy radicals such as, for example, methoxy, propoxy, hexoxy and the like; nitrile groups as already set forth herein; nitro groups, carboalkoxy groups such as, for example, carbomethoxy, carbobutoxy and the like; dialkyl amino groups such as, for example, dimethyl amino, dipropyl amino, methylethyl amino; mercapto; carbonyl; thiocarbonyl; phosphoryl; phosphato; siloxy and so on.

In the copending application, Ser. No. 813,316, filed Apr. 3, 1969, now abandoned, there are described and claimed similar polymeric compounds and a process for their production wherein, however, polycarbonate side chains are grafted on linear copolymers derived from ethylenically unsaturated constituents with mono- or bivalent phenols as members of the copolymeric chains such as vinyl phenols, isopropenyl phenols, allyl phenols and the like. While these ethylenically unsaturated phenol derivatives are difficult to be prepared, the corresponding members of the copolymer chains of the instant invention, the N-methylol or N-methylol ether compounds of ethylenically unsaturated acid amides according to formula IIIa are easily obtainable and commercially available. Further, due to the content of the products of the instant invention of nitrogen atoms these products may easily be dyed with acidic dyestuffs while, in spite of this nitrogen content, surprisingly, the thermostability thereof is very high.

The invention is further illustrated but is not intended to be limited by the following examples in which all parts and percentages are by weight unless otherwise specified and all relative viscosities are measured on solutions of 0.5 g product in 100 ml methylene chloride at 25° C.

The following copolymers are used in the examples below

COPOLYMER M₁

$M_1$ is prepared by reacting the copolymerization product of about 780 parts of styrene and about 19 parts of N-methoxymethyl acrylamide with about 135 parts of bisphenol A (2,2-bis-(4-hydroxyphenyl)propane). The product has a relative viscosity of 1.105 and the formula:

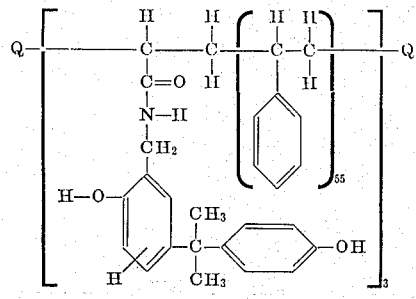

Hence, $M_1$ corresponds to formula II in which A, A', R', R'', R''', E and E' are hydrogen, R is phenyl,

B is the p-isopropylene-hydroxyphenylene radical, $g$ is about 55 and $p$ is about 3.

COPOLYMER M₂

$M_2$ is prepared by reacting the copolymerization product of about 3125 parts of styrene, about 775 parts of acrylonitrile and about 29 parts of N-methoxymethyl-methacrylamide with about 206 parts of bisphenol A. The product has a relative viscosity of 1.16 and the formula:

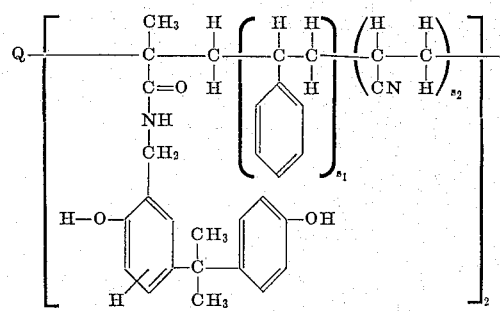

Hence, $M_2$ corresponds to formula II' in which A is methyl, A',R'$_{1a}$      $\kappa_2$, R'',R''',E and E' are hydrogen,

$R_1$ is phenyl, $R_2$ is CN, B is the p-isopropylene-hydroxyphenylene radical, $s_1:s_2 = 121:59$, the product $(s_1+s_2) \cdot g$ equal about 180 and $p$ is about 2.

COPOLYMER M₃

$M_3$ is prepared by reacting the copolymerization product of about 421 parts of styrene, about 345 parts of methacrylic acid methyl ester and about 10 parts of N-methoxymethyl-methacrylamide with about 79 parts of bisphenol A. The reaction product has a relative viscosity of 1.14 and the formula:

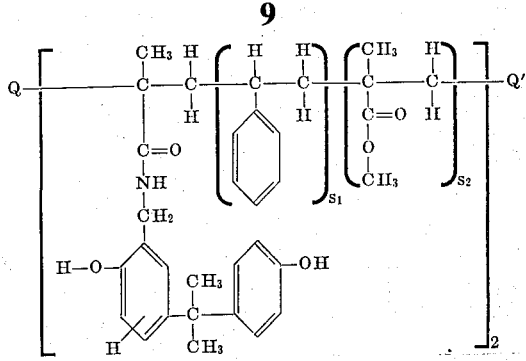

Hence, $M_3$ corresponds to formula II' in which A and $R'_2$ are methyl, A', $R'_1$, R", R''', E and E' are hydrogen,

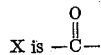

$R_1$ is phenyl,

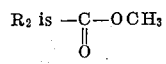

B is the p-isopropylene-hydroxyphenylene radical, $s_1:s_2 = 67:58$, the product $(s_1+s_2) \cdot g$ equal about 125 and $p$ is about 2.

COPOLYMER $M_4$ $M_4$ is prepared by reacting the copolymerization product of about 1,000 parts of methacrylic acid methyl ester and about 13 parts of N-methoxymethyl-methacrylamide with about 102 parts of bisphenol A. The reaction product has a relative viscosity of 1.25 and the formula:

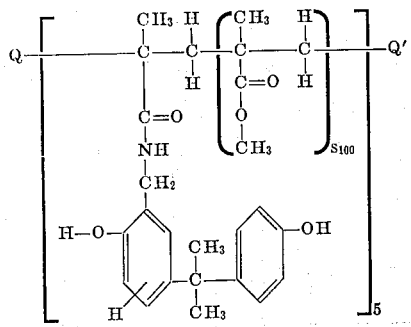

Hence, $M_4$ corresponds to formula II in which A and R' are methyl, A', R", R''', E and E' are hydrogen,

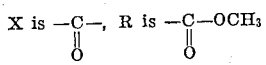

B is the p-isopropylene-hydroxyphenylene radical, $g$ is about 100 and $p$ is about 5.

COPOLYMER $M_5$ $M_5$ is prepared by reacting the copolymerization product of about 3,125 parts of styrene, about 775 parts of acrylonitrile and about 58 parts of N-methoxymethyl methacrylamide with about 42 parts of phenol. The reaction product has a relative viscosity of 1.15 and the formula:

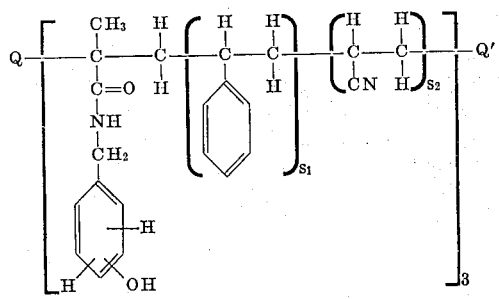

Hence, $M_5$ corresponds to formula II' in which A is methyl, A', $R'_1$, $R'_2$, $\kappa_2$, R", R''', B, E and E' are hydrogen,

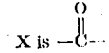

$R_1$ is phenyl, $R_2$ is CN, $s_1:s_2 = 71:35$, the product $(s_1+s_2) \cdot g$ equal about 106 and $p$ is about 3.

COPOLYMER $M_6$ $M_6$ is prepared by the copolymerization of about 94 parts of styrene with about 6 parts of N-(trimethylsiloxybenzyl)-methacrylic acid amide. The reaction product has a viscosity of 1.074 and the formula:

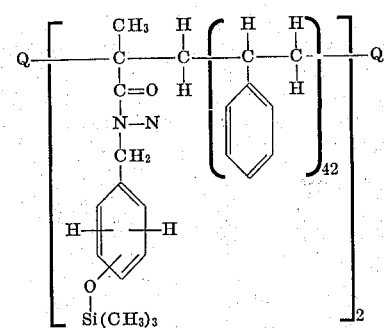

Hence, $M_6$ corresponds to formula II in which A is methyl, A' is hydrogen, R', R" and R''' are hydrogen, R is phenyl,

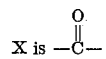

B-E is hydrogen, E' is the trimethylsilyl group, $g$ is about 42 and $p$ is about 2.

EXAMPLE 1

A solution of about 112 parts of copolymer $M_1$ in about 3,300 parts of methylene chloride is mixed with a solution of about 326 parts of bisphenol A, about 8 parts of p-tert.-butylphenol and about 178 parts of sodium hydroxide in about 1,500 parts of water. About 180 parts of phosgene are introduced into the mixture at about 25° C. within about 30 minutes while stirring, after which about 0.6 part of triethylamine are added dropwise. Stirring is then continued for about 30 minutes. The organic phase is separated and worked up. About 449 g. of a condensation product having a relative viscosity of 1.38 are obtained. The product corresponds to formula I in which A, A', R', R" and R''' are hydrogen, R is phenyl, $$X \text{ is } -\underset{\underset{O}{\|}}{C}-$$

B and $Ar_1$ are the bis-(4-phenylene)-isopropylidene radical, $Ar_2$ is the p-tert.-butylphenyl radical, $g$ is about 55, $t$ is 1, $m+n$ equal about 55 and $p$ is about 3.

The molecular weight (numerical average) of the polymer which contains small portions of homopolycarbonate amounts to about 27,000.

EXAMPLE 2

A solution of about 998 parts of copolymer $M_2$ in about 33,000 parts of methylene chloride is mixed with a solution of about 3,372 parts of bisphenol A, about 43 parts of p-tert.-butylphenol, about 15,000 parts of water and about 2,940 parts of a 45 percent caustic soda solution. About 1,780 parts of phosgene are simultaneously introduced into the mixture at about 25° C. within about 90 minutes while stirring, and about 980 parts of a 45 percent caustic soda solution are added dropwise after which about 5 parts of triethylamine are added dropwise. Stirring is then continued for about 30 minutes. The organic phase is separated and worked up. About 4,400 parts of a condensation product having relative viscosity of 1.33 are obtained. This product corresponds to formula I′ in which A is methyl, A′, R′₁, R′₂, R″ and R‴ are hydrogen,

R₁ is phenyl, R₂ is —CN,

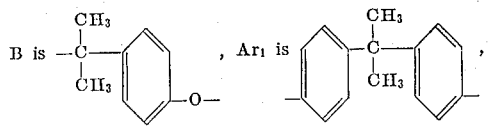

Ar₂ is p-tert.-butylphenyl, $s_1{:}s_2 = 121{:}59$, $(s_1+s_2) \cdot g$ equal about 180, $t$ is 1, $m+n$ equal about 100 and $p$ is about 2.

The molecular weight (numerical average) of the polymer which contains small portions of homopolycarbonate amounts to about 60,000.

EXAMPLE 3

A solution of about 450 parts of copolymer M₃ in about 33,000 parts of methylene chloride is mixed at about 25° C. within about 90 minutes while stirring with a solution of about 3,385 parts of bisphenol A, about 50 parts of p-tert.-butylphenol, about 15,000 parts of water and about 2,950 parts of a 45 percent caustic soda solution. About 1,780 parts of phosgene are introduced into this mixture at about 25° C. within about 90 minutes while stirring, and about 980 parts of a 45 percent caustic soda solution are simultaneously added dropwise, after which about 5 parts of triethylamine are added dropwise. Stirring is then continued for about 30 minutes and the organic phase is separated and worked up. About 3,800 parts of a condensation product having a relative viscosity of 1.40 are obtained. The product corresponds to formula I′ in which A and R′₂ are methyl, A′, R′₁, R″ and R‴ are hydrogen,

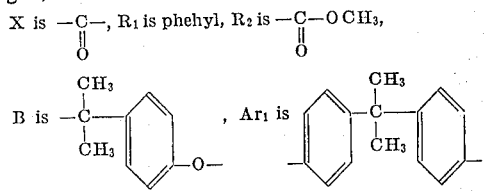

Ar₂ is p-tert.-butylphenyl, $s_1{:}s_2 = 67{:}58$, $(s_1+s_2) \cdot g$ equal about 125, $t$ is 1, $m+n$ equal about 88 and $p$ is about 2.

The molecular weight (numerical average) of the polymer which contains portions of homopolycarbonate amounts to about 38,000.

EXAMPLE 4

A solution of about 42 parts of copolymer M₄ in about 3,300 parts of methylene chloride is mixed with a solution of about 335 parts of bisphenol A, about 8 parts of p-tert.-butylphenol and about 294 parts of a 45 percent caustic soda solution in about 1,500 parts by weight water. About 178 parts of phosgene are introduced into the mixture at about 25° C. within about 30 minutes while stirring and about 98 parts of a 45 percent caustic soda solution are added dropwise after which about 0.5 part of triethylamine are added. The mixture is then stirred for another 30 minutes, the organic phase is separated and worked up. About 350 parts of a condensation product having a relative viscosity of 1.32 are obtained. The product corresponds to formula I in which A and R′ are methyl, A′, R″ and R‴ are hydrogen,

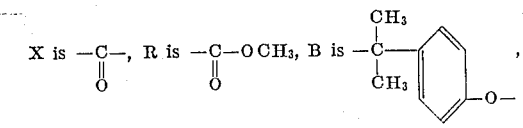

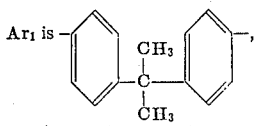

Ar₂ is p-tert.-butylphenyl, $g$ is about 100, $t$ is 1, $n+m$ equal about 54 and $p$ is about 5.

The molecular weight (numerical average) of the polymer which contains portions of homopolycarbonate amounts to about 40,000.

EXAMPLE 5

About 998 parts of copolymer M₅ are reacted as described in Example 2 with about 3,372 parts of bisphenol A and about 15 parts of p-tert.-butylphenol. The polycondensation product has a relative viscosity of 1.52 and corresponds to formula I′ in which A is methyl, A′, R′₁, R′₂, R″, R‴ and B are hydrogen,

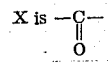

R₁ is phenyl, R₂ is —CN,

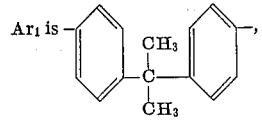

Ar₂ is p-tert.-butylphenyl, $s_1{:}s_2 = 71{:}35$, $(s_1+s_2) \cdot g$ equal about 106, $m$ is about 130, $t$ is 0 and $p$ is about 3.

The molecular weight (numerical average) of the polymer amounts to about 120,000.

EXAMPLE 6

A solution of about 64.5 parts of copolymer M₆ in about 3,300 parts of methylene chloride is mixed with a solution of about 342 parts of bisphenol A, about 3 parts of p-tert.-butylphenol and about 178 parts of sodium hydroxide in about 1,500 parts of water. About 180 parts of phosgene are introduced into the mixture at about 25° C. within about 30 minutes and about 0.5 part of triethylamine is then added dropwise. Stirring is then continued for another 30 minutes, the organic phase is separated and worked up. About 400 parts of a condensation product having a relative viscosity of 1.42 are obtained. The product corresponds to formula I in which A is methyl, A′, R′, R″, R‴ and B are hydrogen,

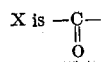

R is phenyl,

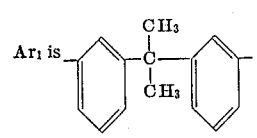

Ar₂ is p.-tert.-butylphenyl, $g$ is about 42, $m$ is about 75, $t$ is 0 and $p$ is about 2.

The product contains virtually no homopolycarbonate and has a molecular weight (numerical average) of about 45,000.

In some of the foregoing examples there is indicated the value of the sum $m+n$. It is to be assumed that in general $m$ is about equal $n$, thus the value of each $m$ and $n$ being about half of the sum $m+n$, however, it is not quite sure that polycarbonate chains of precisely the same length will graft on the groups B-E and O-E′ of the above formula II (and II′). Therefore, it seems to be more correct to indicate the values of the sums $m+n$ rather than the specific values of $m$ and $n$.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. As a composition of matter polymeric compounds having the formula

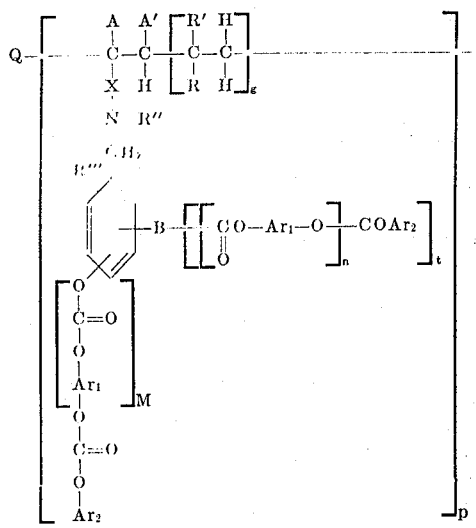

wherein A is hydrogen or methyl,

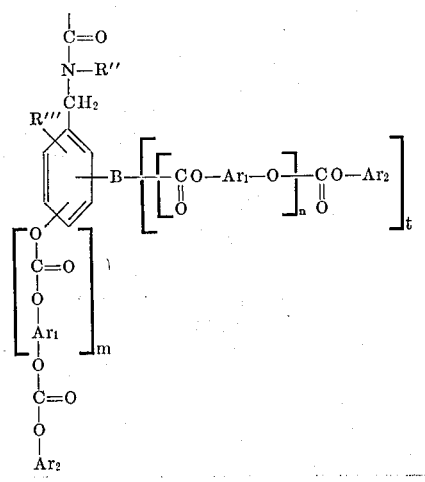

R is halogen, alkyl, phenyl, vinyl, an ester group of a monohydric alcohol having the formula

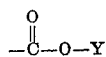

wherein Y is the hydrocarbon radical of the alcohol, the amide or nitrile group, an ester group of a monocarboxylic acid having the formula

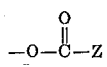

wherein Z is the hydrocarbon radical of the acid or an alkyl ether group;
R' is hydrogen, halogen, methyl or nitrile;
R'' is hydrogen or alkyl;
R''' is hydrogen, alkyl, halogen, hydroxy or a phenolic radical which is bound either directly or via a methylene group, an oxygen or sulphur atom, a sulphonyl or sulphoxide group or a silane group;

X is the $>C=O$ or the $>SO_2$ group;

B is oxygen, hydrogen or a phenoxy radical which may be linked to the benzene ring either directly or via a carbon, oxygen, sulphur or silicon atom, with the proviso that when $t$ is 0, B is hydrogen;
$Ar_1$ is the residue remaining after the removal of two phenolic hydroxy groups from a bivalent phenol,
$Ar_2$ is the residue remaining after the removal of one phenolic hydroxy group from a monovalent phenol
Q and Q' are the endgroups of the copolymerisates as they are formed by the copolymerization reaction initiated by ionic catalysts or free radicals;
$g$ is an integer from about 9 to about 1,000;
$m$ is an integer from about 5 to about 200;
$n$ is an integer from 0 to about 200;
$t$ is 0 or 1
and $p$ is an integer from 1 to about 15.

2. The polymeric compounds of claim 1 wherein A is hydrogen or methyl, A' is hydrogen or

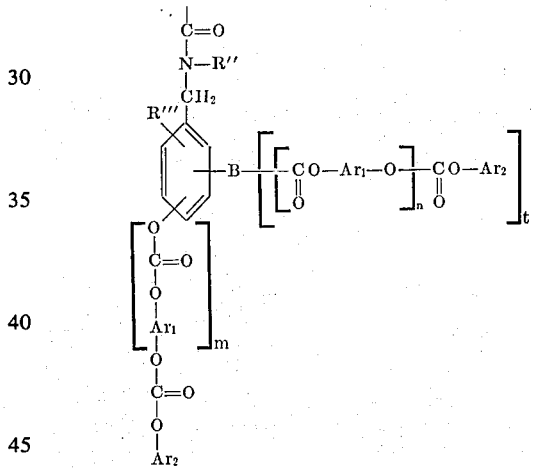

R is halogen, an alkyl group having up to six carbon atoms, phenyl, vinyl, an ester group of a monohydric alcohol having the formula

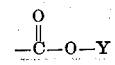

wherein Y is the hydrocarbon radical of the alcohol having up to eight carbon atoms, the amide or nitrile group, an ester group of a monocarboxylic acid having the formula

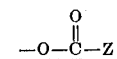

wherein Z is the hydrocarbon radical of the acid or an alkyl ether group containing up to eight carbon atoms; R' is hydrogen, halogen, methyl or nitrile; R'' is hydrogen or an alkyl group having up to six carbon atoms; R''' is hydrogen, an alkyl group having up to six carbon atoms, halogen, hydroxy or a phenolic radical bound directly or via a methylene group, an oxygen or sulphur atom, a sulphonyl or sulphoxide group or a silane group;

X is the $>C=O$ or the $>SO_2$ group;

B is oxygen, hydrogen or a phenoxy radical which may be linked to the benzene ring either directly or via a carbon, oxygen, sulphur or silicon atom, with the proviso that when $t$ is 0, B is hydrogen; $Ar_1$ contains a free hydroxy group; $Ar_2$ is a monovalent phenol radical; $g$ is an integer from about 9 to about 1,000; $m$ is an integer from about 5 to about 200; $n$ is an integer from 0 to about 200; $t$ is 0 or 1 and $p$ is an integer from 1 to about 15.

3. The polymeric compounds of claim 1 wherein A, A', R', R'' and R''' are hydrogen, R is phenyl,

B and $Ar_1$ are the bis(4-phenylene)-isopropylidene radical, $Ar_2$ is the p-tert.-butylphenyl radical, $g$ is about 55, $m+n$ equal about 55, $t$ is 1 and $p$ is about 3.

4. The polymeric compounds of claim 1 wherein A is methyl, A', R', R'' and R''' are hydrogen, R is phenyl and —CN,

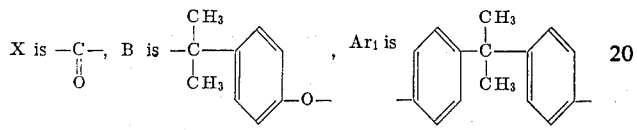

$Ar_2$ is p-tert.-butylphenyl, $g$ is about 180, $m+n$ equal about 100, $t$ is 1 and $p$ is about 2.

5. The polymeric compounds of claim 1 wherein A is methyl, A', R'' and R''' are hydrogen, R' is hydrogen and methyl,

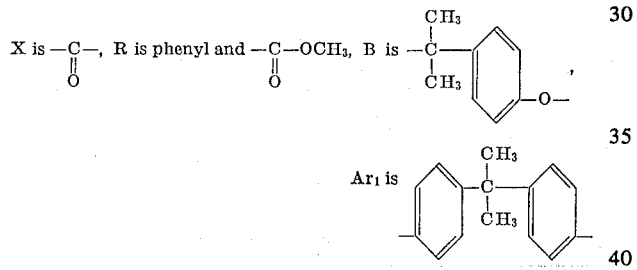

$Ar_2$ is p-tert-butylphenyl, $g$ is about 125, $m+n$ equal about 88, $t$ is 1 and $p$ is about 2.

6. The polymeric compounds of claim 1 wherein A and R' are methyl, A', R'' and R''' are hydrogen,

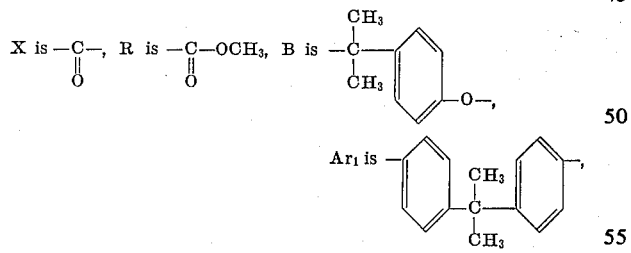

$Ar_2$ is p-tert.-butylphenyl, $g$ is about 100, $n+m$ equal 54, $t$ is 1 and $p$ is about 5.

7. The polymeric compounds of claim 1 wherein A is methyl, A', R', R'', R''' and B are hydrogen,

R is phenyl and —CN,

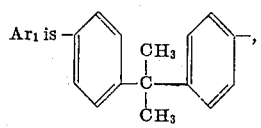

$Ar_2$ is p-tert.-butylphenyl, $g$ is about 106, $m$ is 130, $n$ and $t$ are 0 and $p$ is about 3.

8. The polymeric compounds of claim 1 wherein A is methyl, A', R', R'', R''' and B are hydrogen,

R is phenyl,

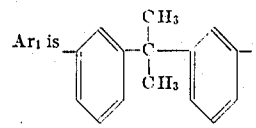

, $Ar_2$ is p-tert.-butylphenyl, $g$ is about 42, $m$ is about 75, $n$ and $t$ are 0 and $p$ is about 2.

9. A method for preparing the polymeric compounds of claim 1 which comprises reacting a polycarbonate forming derivative of carbonic acid with a bivalent phenol, a monophenol and a copolymer having the formula

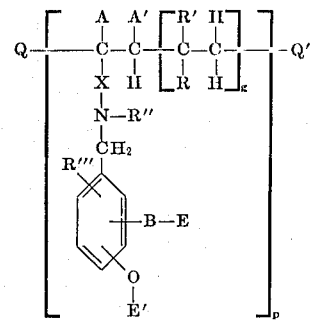

wherein A is hydrogen or methyl, A' is hydrogen or

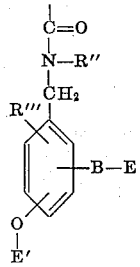

R is halogen, alkyl, phenyl, vinyl, an ester group of a monohydric alcohol having the formula

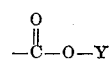

wherein Y is the hydrocarbon radical of the alcohol, the amide or nitrile group, an ester group of a monocarboxylic acid having the formula

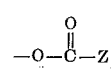

wherein Z is the hydrocarbon radical of the acid or an alkyl ether group; R' is hydrogen, halogen, methyl or nitrile; R'' is hydrogen or alkyl; R''' is hydrogen, alkyl, halogen, hydroxy or a phenolic radical which is bound either directly or via a methylene group, an oxygen or sulphur atom, a sulphonyl or sulphoxide group or a silane group;

X is the $>C=O$ or the $>SO_2$ group;

B is oxygen, hydrogen or a phenoxy radical which may be linked to the benzene ring either directly or via a carbon, oxygen, sulphur or silicon atom, with the proviso that when E is 0, B is hydrogen; E and E' are hydrogen, the chlorocarbonic acid ester group, the monophenyl carbonic acid ester group or the trimethylsilyl group, $g$ is an integer from about 9 to about 1,000 and $p$ is an integer from 1 to about 15 with the proviso that at least one mol of bivalent phenol and carbonic acid derivative are reacted for every phenolic hydroxyl group of the copolymer.

10. As a composition of matter polymeric compounds having the formula

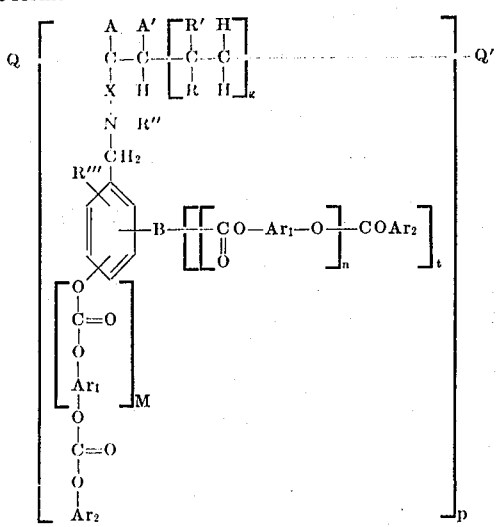

wherein A is hydrogen or methyl,

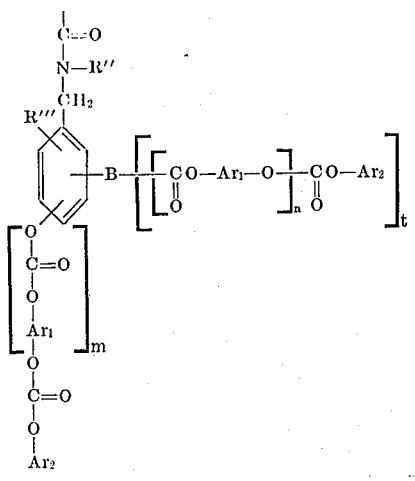

R is halogen, alkyl, phenyl, vinyl, an ester group of a monohydric alcohol having the formula

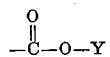

wherein Y is the hydrocarbon radical of the alcohol, the amide or nitrile group, an ester group of a monocarboxylic acid having the formula

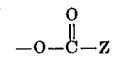

wherein Z is the hydrocarbon radical of the acid or an alkyl ether group;

R' is hydrogen, halogen, methyl or nitrile;

R'' is hydrogen or alkyl;

R''' is hydrogen, alkyl, halogen, hydroxy or a phenolic radical which is bound either directly or via a methylene group, an oxygen or sulphur atom, a sulphonyl or sulphoxide group or a silane group;

X is the >C=O or the >SO$_2$ group;

B is oxygen, hydrogen or a phenoxy radical which may be linked to the benzene ring either directly or via a carbon, oxygen, sulphur or silicon atom, with the proviso that when $t$ is 0, B is hydrogen;

Ar$_1$ is phenylene, naphthalene, anthracene, fluorene, phenanthrene, biphenylene, triphenylene, a bisphenyl alkane, a bisphenyl cycloalkane, a bisphenyl ether, a bisphenyl sulfide, a bisphenyl sulfone, a bisphenyl ketone or a bisphenyl benzene;

Ar$_2$ is a methyl, ethyl, propyl, butyl or halogen substituted phenyl, naphthyl, anthryl or phenanthryl radical, an alkyl benzene radical containing one to four carbon atoms in the alkyl group or a halophenyl radical;

Q and Q' are the endgroups of the copolymerisates as they are formed by the copolymerization reaction initiated by ionic catalysts or free radicals;

$g$ is an integer from about 9 to about 1,000;

$m$ is an integer from about 5 to about 200;

$n$ is an integer from 0 to about 200;

$t$ is 0 or 1 and $p$ is an integer from 1 to about 15.

* * * * *

UNITED STATES PATENT OFFICE
CERTIFICATE OF CORRECTION

Patent No. 3,670,051          Dated June 13, 1972

Inventor(s) Ferdinand Senge, Kurt Weirauch and Ludwig Bottenbruch

It is certified that error appears in the above-identified patent and that said Letters Patent are hereby corrected as shown below:

In the Abstract, second column, first line, after the last formula, "-C N" should be -- - C≡N --
    second line after the last formula delete "oc-"; next line delete "toxy" and substitute --about--; next line, delete "ocotxy" and substitute --octoxy--. Column 1, lines 56 and 57, delete the entire lines and substitute --in which A is hydrogen or the methyl group, A' is hydrogen or the radical--. Column 5, formula V, line 47, "N-R'" should be --N-R" --; formula VI, line 59, "N-R'" should be --N-R"--. Column 7, line 48, "specially" should be --specifically--. Column 8, line 62, "$R'_{1a}$ $K_2$" should be --$R'_1$, $R'_2$--. Column 9, in the formula between lines 35 and 40, subscript after bracket reads "S100" should be --100--. Column 10, line 2, delete "$K_2$"; in the formula between lines 20 and 25, "N-N" should be --N-H--. Column 11, line 46, in the formula "phehyl" should be --phenyl--. Column 12, line 60, delete the formula and substitute

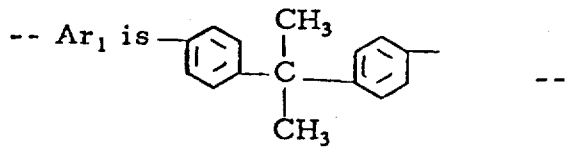

continued on page 2

UNITED STATES PATENT OFFICE
CERTIFICATE OF CORRECTION

Patent No. 3,670,051    Dated  June 13, 1972

Inventor(s) Ferdinand Senge, Kurt Weirauch and Ludwig Bottenbruch

It is certified that error appears in the above-identified patent and that said Letters Patent are hereby corrected as shown below:

Page 2 of 2 pages

Column 13, in the first formula, between lines 20 and 25, outside the first double brackets "COAr$_2$" should read --COAr$_2$-- ;
                                                   ||
                                                   O line 35, add --A' is hydrogen or --

Column 16, line 5, delete the formula and substitute

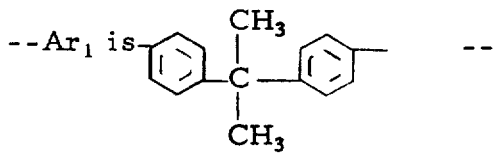

Column 17, in the first formula, outside the double brackets "COAr$_2$" should be --COAr$_2$-- ;      at
                  ||
                  O line 27, after "methyl," add --A' is hydrogen or --.

Signed and sealed this 10th day of April 1973.

(SEAL)
Attest:

EDWARD M. FLETCHER, JR.
Attesting Officer

ROBERT GOTTSCHALK
Commissioner of Patents